United States Patent
Zhao et al.

(10) Patent No.: US 10,454,359 B2
(45) Date of Patent: *Oct. 22, 2019

(54) APPARATUS AND METHOD OF FAST COMMUTATION FOR MATRIX CONVERTER-BASED RECTIFIER

(71) Applicant: Murata Manufacturing Co., Ltd., Nagaokakyo-shi, Kyoto-fu (JP)

(72) Inventors: Tao Zhao, Markham (CA); Dewei Xu, Markham (CA); Jahangir Afsharian, Markham (CA); Bing Gong, Markham (CA); Zhihua Yang, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,069

(22) Filed: Dec. 5, 2018

(65) Prior Publication Data

US 2019/0109531 A1 Apr. 11, 2019

Related U.S. Application Data

(63) Continuation of application No. 15/975,827, filed on May 10, 2018, now Pat. No. 10,153,686, which is a continuation of application No. 15/548,960, filed as application No. PCT/US2016/024351 on Mar. 25, 2016, now Pat. No. 10,008,920.

(60) Provisional application No. 62/138,039, filed on Mar. 25, 2015.

(51) Int. Cl.
*H02M 1/08* (2006.01)
*H02M 7/155* (2006.01)
*H02M 1/088* (2006.01)
*H02M 5/293* (2006.01)
*H02M 7/162* (2006.01)
*H02M 1/38* (2007.01)
*H02M 7/5387* (2007.01)

(52) U.S. Cl.
CPC ............ *H02M 1/088* (2013.01); *H02M 1/38* (2013.01); *H02M 5/293* (2013.01); *H02M 7/1552* (2013.01); *H02M 7/1623* (2013.01); *H02M 7/162* (2013.01); *H02M 2005/2932* (2013.01); *H02M 2007/53876* (2013.01)

(58) Field of Classification Search
CPC .......... H02M 1/12; H02M 1/088; H02M 5/14; H02M 7/1552; H02M 7/527
See application file for complete search history.

(56) References Cited

U.S. PATENT DOCUMENTS 6,166,930 A * 12/2000 Czerwinski ........... H02M 5/271
                                                              318/811
6,462,974 B1 * 10/2002 Jadric ................. H02M 1/4216
                                                              363/127

(Continued)

OTHER PUBLICATIONS

Zhao et al., "Apparatus and Method of Fast Commutation for Matrix Converter-Based Rectifier", U.S. Appl. No. 15/975,827, filed May 10, 2018.

*Primary Examiner* — Yusef A Ahmed
(74) *Attorney, Agent, or Firm* — Keating & Bennett, LLP

(57) ABSTRACT

A method of commutation in a matrix rectifier from an active vector to a zero vector includes two steps. A method of commutation in a matrix rectifier from a zero vector to an active vector includes three steps.

2 Claims, 14 Drawing Sheets

(56) References Cited

U.S. PATENT DOCUMENTS

| | | | | |
|---|---|---|---|---|
| 7,492,616 B2* | 2/2009 | Fu | ............... | H02M 7/53873 363/40 |
| 9,520,764 B1* | 12/2016 | Bundschuh | ............ | H02M 1/08 |
| 9,774,246 B2* | 9/2017 | Wang | ............ | H02M 7/219 |
| 2002/0135234 A1* | 9/2002 | Chekhet | ............ | H02M 5/271 307/82 |
| 2003/0202370 A1* | 10/2003 | Simon | ............ | H02M 5/271 363/131 |
| 2004/0027843 A1* | 2/2004 | Mahlein | ............ | H02M 5/2573 363/159 |
| 2008/0013351 A1* | 1/2008 | Alexander | ......... | H02M 3/1582 363/123 |
| 2008/0049460 A1* | 2/2008 | Mohan | ............ | H02M 5/271 363/34 |
| 2008/0266918 A1* | 10/2008 | Vilain | ............ | H02M 7/53875 363/95 |
| 2010/0165674 A1* | 7/2010 | Dai | ............ | H02M 7/53873 363/37 |
| 2010/0213769 A1* | 8/2010 | Sakakibara | ............ | H02M 5/297 307/82 |
| 2011/0122661 A1* | 5/2011 | Sakakibara | ......... | H02M 5/4585 363/37 |
| 2011/0292697 A1* | 12/2011 | Alexander | ............ | H02M 5/275 363/37 |
| 2012/0075892 A1* | 3/2012 | Tallam | ............ | H02M 1/12 363/37 |
| 2012/0147639 A1* | 6/2012 | Mao | ............ | H02M 7/493 363/98 |
| 2012/0201056 A1* | 8/2012 | Wei | ............ | H02M 5/4585 363/37 |
| 2014/0226386 A1* | 8/2014 | Saito | ............ | H02M 5/293 363/132 |
| 2015/0124505 A1* | 5/2015 | Wang | ............ | H02M 7/219 363/126 |
| 2017/0229972 A1* | 8/2017 | Cerqueira Pinto Bezerra Varaj O | ............ | G01R 25/005 |
| 2017/0279370 A1* | 9/2017 | Zhao | ............ | H02M 5/297 |

* cited by examiner

APPARATUS AND METHOD OF FAST COMMUTATION FOR MATRIX CONVERTER-BASED RECTIFIER

BACKGROUND OF THE INVENTION

1. Field of the Invention

The present invention relates to matrix converters. More specifically, the present invention relates to fast commutation for the rectifiers of matrix converters.

2. Description of the Related Art

FIG. 1A is a circuit diagram showing the topology of a 3-phase-to-1-phase matrix converter, and FIG. 1B is an equivalent circuit diagram of a portion of the 3-phase-to-1-phase matrix converter shown in FIG. 1A. Each of the circuits shown in FIGS. 1A and 1B can be used either with known commutation methods discussed in this section or with the novel commutation methods according to the preferred embodiments of the present invention discussed in the Detailed Description of Preferred Embodiments section below.

In FIG. 1A, "line side" refers to the portion of the circuit on the left-hand side of the transformer $T_r$ that is connected to the line voltages $u_a$, $u_b$, $u_c$ for each of the phases A, B, C, and "load side" refers to the portion of the circuit on the right-hand side of the transformer $T_r$ that is connected to the output voltage $u_o$, i.e., the load. On the line side, the three-phase AC current is combined into a single-phase AC current, and on the load side, the single-phase AC current is rectified by diodes $D_1$ to $D_4$ to provide DC current.

The isolated matrix rectifier of FIG. 1A includes filter inductors $L_f$ and filter capacitors $C_f$ that define a line-side filter that reduces the total harmonic distortion (THD), bi-directional switches $S_1$ to $S_6$ arranged in a bridge as a 3-phase-to-1-phase matrix converter, a transformer $T_r$ that provides high-voltage isolation between the line-side circuit and the load-side circuit, four diodes $D_1$ to $D_4$ arranged in a bridge to provide output rectification, an output inductor $L_o$ and an output capacitor $C_o$ that define a load-side filter for the output voltage. Bi-directional switches $S_1$ to $S_6$ are used in this isolated matrix rectifier to open or close the current path in either direction. As shown in FIG. 1A, the bi-directional switches $S_1$ to $S_6$ include two uni-directional switches connected in parallel. Thus, switch $S_i$ in FIG. 1A corresponds to switches $S_{1i}$ and $S_{2i}$ in FIG. 1B, where i=1, 2, 3, 4, 5, 6.

As shown in FIG. 1A, the rectifier of the matrix converter preferably includes two parts: (1) a 3-phase-to-1-phase matrix converter and (2) a diode rectifier. The matrix converter and the diode rectifier are isolated by a high-frequency transformer $T_r$. As shown in FIG. 1B, the matrix converter can be considered a reverse parallel connection of two current-source rectifiers that are labeled as converter #1 and converter #2. Converter #1 can provide a positive voltage pulse and can be referred to as a positive rectifier, and converter #2 can provide a negative voltage pulse and can be referred to as a negative rectifier.

The controller of the matrix converter turns the switches $S_1$ to $S_6$ on and off to generate a desired output voltage $u_o$. One method for determining when and for how long the switches $S_1$ to $S_6$ are turned on is space-vector modulation (SVM). SVM is an algorithm for the pulse-width modulation (PWM) of the switches $S_1$ to $S_6$. That is, SVM is used to determine when the bi-directional switches $S_1$ to $S_6$ should be turned on and off. The bi-directional switches $S_1$ to $S_6$ are controlled by digital signals, e.g., either ones or zeros. Typically, a one means the switch is on, and a zero means the switch is off. In PWM, the width of the on signal, controls how long a switch is turned on, i.e., modulated. Implementations of SVM are disclosed in U.S. Application No. 62/069,815, which is hereby incorporated by reference in its entirety.

For the matrix converter shown in FIG. 1A, the switching function $S_i$ can be defined as $$S_i = \begin{cases} 1, & S_i \text{ turn on} \\ 0, & S_i \text{ turn off} \end{cases} i \in \{1, 2, 3, 4, 5, 6\}$$

where $S_i$ is the switching function for the $i^{th}$ switch. For example, if $S_1=1$, then switch $S_1$ is on, and if $S_1=0$, then switch $S_1$ is off.

In FIG. 1A, only two switches can be turned on at the same time to define a single current path. For example, if switches $S_1$ and $S_6$ are on, a single current path is defined between phases A and B through the transformer $T_r$. If only two switches can conduct at the same time, with one switch in the top half of the bridge ($S_1$, $S_3$, $S_5$) and with the other switch in the bottom half of the bridge ($S_2$, $S_4$, $S_6$), then there are nine possible switching states as listed in Tables 1 and 2, including six active switching states and three zero switching states. In Table 1, line currents $i_a$, $i_b$, $i_c$ are the currents in phases A, B, C, and the line-side current $i_p$ is the current through the primary winding of the transformer $T_r$. In Table 2, the transformer turns ratio k is assumed to be 1 so that the inductor current $i_L$ is equal to the line-side current $i_p$.

TABLE 1

Space Vectors, Switching States, and Phase Currents

| Space Vector | Switching States | | | | | | | | |
|---|---|---|---|---|---|---|---|---|---|
| | $S_1$ | $S_2$ | $S_3$ | $S_4$ | $S_5$ | $S_6$ | $i_a$ | $i_b$ | $i_c$ |
| $I_1$ | 1 | 0 | 0 | 0 | 0 | 1 | $i_p$ | $-i_p$ | 0 |
| $I_2$ | 1 | 1 | 0 | 0 | 0 | 0 | $i_p$ | 0 | $-i_p$ |
| $I_3$ | 0 | 1 | 1 | 0 | 0 | 0 | 0 | $i_p$ | $-i_p$ |
| $I_4$ | 0 | 0 | 1 | 1 | 0 | 0 | $-i_p$ | $i_p$ | 0 |
| $I_5$ | 0 | 0 | 0 | 1 | 1 | 0 | $-i_p$ | 0 | $i_p$ |
| $I_6$ | 0 | 0 | 0 | 0 | 1 | 1 | 0 | $-i_p$ | $i_p$ |
| $I_7$ | 1 | 0 | 0 | 1 | 0 | 0 | 0 | 0 | 0 |
| $I_8$ | 0 | 0 | 1 | 0 | 0 | 1 | 0 | 0 | 0 |
| $I_9$ | 0 | 1 | 0 | 0 | 1 | 0 | 0 | 0 | 0 |

TABLE 2

Space Vectors, Switching States, and Phase Currents

| Space Vector | Switching States | | | | | | | | |
|---|---|---|---|---|---|---|---|---|---|
| | $S_1$ | $S_2$ | $S_3$ | $S_4$ | $S_5$ | $S_6$ | $i_a$ | $i_b$ | $i_c$ |
| $I_1$ | 1 | 0 | 0 | 0 | 0 | 1 | $i_d$ | $-i_d$ | 0 |
| $I_2$ | 1 | 1 | 0 | 0 | 0 | 0 | $i_d$ | 0 | $-i_d$ |
| $I_3$ | 0 | 1 | 1 | 0 | 0 | 0 | 0 | $i_d$ | $-i_d$ |
| $I_4$ | 0 | 0 | 1 | 1 | 0 | 0 | $-i_d$ | $i_d$ | 0 |
| $I_5$ | 0 | 0 | 0 | 1 | 1 | 0 | $-i_d$ | 0 | $i_d$ |
| $I_6$ | 0 | 0 | 0 | 0 | 1 | 1 | 0 | $-i_d$ | $i_d$ |
| $I_7$ | 1 | 0 | 0 | 1 | 0 | 0 | 0 | 0 | 0 |
| $I_8$ | 0 | 0 | 1 | 0 | 0 | 1 | 0 | 0 | 0 |
| $I_9$ | 0 | 1 | 0 | 0 | 1 | 0 | 0 | 0 | 0 |

The matrix-converter's controller determines a reference current $\vec{I}_{ref}$ and calculates the on and off times of the switches $S_1$ to $S_6$ to approximate the reference current $\vec{I}_{ref}$ to produce the line-side currents $i_a$, $i_b$, and $i_c$. The reference current $\vec{I}_{ref}$ preferably is sinusoidal with a fixed frequency and a fixed magnitude: $\vec{I}_{ref} = \vec{I}_{ref} e^{j\theta}$. The fixed frequency is preferably the same as the fixed frequency of each of the three-phase $i_a(t)$, $i_b(t)$, and $i_c(t)$ to reduce harmful reflections. The controller determines the magnitude of the reference current $\vec{I}_{ref}$ to achieve a desired output voltage $u_o$. That is, the controller regulates the output voltage $u_o$ by varying the magnitude of the reference current $\vec{I}_{ref}$. Varying the magnitude of the reference current $\vec{I}_{ref}$ changes the on and off times of the switches $S_1$ to $S_6$.

The reference current $\vec{I}_{ref}$ moves through the α-β plane shown in FIG. 14. The angle θ is defined as the angle between the a-axis and the reference current $\vec{I}_{ref}$. Thus, as the angle θ changes, the reference current $\vec{I}_{ref}$ sweeps through the different sectors I-VI.

The reference current $\vec{I}_{ref}$ can be synthesized by using combinations of the active and zero vectors. As used herein "synthesized" means that the reference current $\vec{I}_{ref}$ can be represented as a combination of the active and zero vectors. The active and zero vectors are stationary and do not move in the α-β plane as shown in FIG. 14. The vectors used to synthesize the reference current $\vec{I}_{ref}$ change depending on which sector the reference current $\vec{I}_{ref}$ is located. The active vectors are chosen by the active vectors defining the sector. The zero vector is chosen for each sector by determining which on switch the two active vectors have in common and choosing the zero vector that also includes the same on switch. Using the zero vectors allows the magnitude of the line-side current $i_p$ to be adjusted.

For example, consider when the current reference $\vec{I}_{ref}$ is in sector I. The active vectors $\vec{I}_1$ and $\vec{I}_2$ define sector I. The switch $S_1$ is on for both active vectors $\vec{I}_1$ and $\vec{I}_2$. The zero vector $\vec{I}_7$ also has the switch $S_1$ on. Thus, when the reference current $\vec{I}_{ref}$ is located in sector I, the active vectors $\vec{I}_1$ and $\vec{I}_2$ and zero vector $\vec{I}_7$ are used to synthesize the reference current $\vec{I}_{ref}$, which provides the following equation, with the right-hand side of the equation resulting from vector $\vec{I}_7$ being a zero vector with zero magnitude:

$$\vec{i}_{ref} = \frac{T_1}{T_s}\vec{i}_1 + \frac{T_2}{T_s}\vec{i}_2 + \frac{T_7}{T_s}\vec{i}_7 = \frac{T_1}{T_s}\vec{i}_1 + \frac{T_2}{T_s}\vec{i}_2$$

where $T_1$, $T_2$, and $T_0$ are the dwell times for the corresponding active switches and $T_s$ is the sampling period.

The dwell time is the on time of the corresponding switches. For example, $T_1$ is the on time of the switches $S_1$ and $S_6$ for the active vector $\vec{I}_1$. Because the switch $S_1$ is on for each of vectors $\vec{I}_1$, $\vec{I}_2$, and $\vec{I}_7$, the switch $S_1$ is on during the entire sampling period $T_s$. The ratio $T_1/T_s$ is the duty cycle for the switch $S_6$ during the sampling period $T_s$.

The sampling period $T_s$ is typically chosen such that the reference current $\vec{I}_{ref}$ is synthesized multiple times per sector. For example, the reference current $\vec{I}_{ref}$ can be synthesized twice per sector so that the reference current $\vec{I}_{ref}$ is synthesized twelve times per cycle, where one complete cycle is when the reference current $\vec{I}_{ref}$ goes through sectors I-VI.

The dwell times can be calculated using the ampere-second balancing principle, i.e., the product of the reference current $\vec{I}_{ref}$ and sampling period $T_s$ equals the sum of the current vectors multiplied by the time interval of synthesizing space vectors. Assuming that the sampling period $T_s$ is sufficiently small, the reference current $\vec{I}_{ref}$ can be considered constant during the sampling period $T_s$. The reference current $\vec{I}_{ref}$ can be synthesized by two adjacent active vectors and a zero vector. For example, when the reference current $\vec{I}_{ref}$ is in sector I, the reference current $\vec{I}_{ref}$ can be synthesized by vectors $\vec{I}_1$, $\vec{I}_2$, and $\vec{I}_7$. The ampere-second balancing equation is thus given by the following equations.

$$\vec{I}_{ref}T_s = \vec{I}_1 T_1 + \vec{I}_2 T_2 + \vec{I}_7 T_7$$

$$T_s = T_1 + T_2 + T_7$$

where $T_1$, $T_2$, and $T_7$ are the dwell times for the vectors $\vec{I}_1$, $\vec{I}_2$, and $\vec{I}_7$ and $T_s$ is sampling time. Then the dwell times are given by $$T_1 = mT_s \sin(\pi/6 - \theta)$$

$$T_2 = mT_s \sin(\pi/6 + \theta)$$

$$T_7 = T_s - T_1 - T_2$$

where $$m = k\frac{I_{ref}}{i_L},$$

θ is sector angle between current reference $\vec{I}_{ref}$ and a-axis shown in FIG. 5, and k is the transformer turns ratio.

Because of the isolation provided by the transformer, the matrix-converter output voltage $u_1(t)$ must alternate between positive and negative with high frequency to maintain the volt-sec balance. Thus, the preferred vector sequence in every sampling period $T_s$ is divided into eight segments as $\vec{I}_\alpha, \vec{I}_0, -\vec{I}_\beta, \vec{I}_0, \vec{I}_\beta, \vec{I}_0, -\vec{I}_\alpha, \vec{I}_0$, where vectors $\vec{I}_\alpha$ and $\vec{I}_\beta$ are active vectors and $\vec{I}_0$ is a zero vector. For example, in sector I, vectors $\vec{I}_\alpha$ and $\vec{I}_\beta$ are active vectors $\vec{I}_1$ and $\vec{I}_2$, and vector $\vec{I}_0$ is zero vector $\vec{I}_7$. When converter #1 is active, a positive vector can be used, and when converter #2 is active, a negative vector can be used.

The waveforms of the matrix-converter output voltage $u_1(t)$ and the matrix-converter output current $i_p(t)$ during one sampling period $T_s$ are shown in FIG. 5. In FIG. 5, the matrix-converter output voltage $u_1(t)$ has three kinds of polarities:

(1) $u_1(t)$ has positive polarity between times $t_0$ and $t_1$ and between times $t_4$ and $t_5$. These time intervals can be referred to as P-intervals. The current vector in a P-interval can be referred to as a P-vector. Under the effect of a P-vector, the matrix-converter output current $i_p(t)$ increases.

(2) $u_1(t)$ has negative polarity between times $t_2$ and $t_3$ and between times $t_6$ and $t_7$. These time intervals can be referred to as N-intervals. The current vector in a N-interval can be referred to as a N-vector. Under the effect of an N-vector, the matrix-converter output current it) decreases.

(3) $u_1(t)$ is zero between times $t_1$ and $t_2$, between times $t_3$ and $t_4$, between times $t_5$ and $t_6$, and between times $t_7$ and $t_8$. These time intervals can be referred to as Z-intervals. The current vector in a Z-interval can be referred to as a Z-vector. Under the effect of a Z-vector, the absolute value of the matrix-converter output current $i_p(t)$ decreases at most to be zero, and the direction of the matrix-converter output current $i_p(t)$ will not change during the Z-interval.

In one sampling period $T_s$, the eight intervals are in sequence: P-interval, Z-interval, N-interval, Z-interval, P-interval, Z-interval, N-interval, Z-interval. As shown in FIG. 5, there is a commutation between the different intervals.

Commutation refers to turning on and off of the switches to switch from one vector to another vector. Known commutation methods for matrix converters are 4-step commutation methods based on either output current or input voltage. These known commutation methods are very complicated and require accurately measuring either the output current or the input voltage.

(1) Known 4-Step Current-Based Commutation

The 4-step current-based commutation measures the output current direction. The two-phase-to-single-phase matrix converter in FIG. 2 illustrates the problems with current-based commutation. All the important commutations can be seen in the circuit shown in FIG. 2.

As an example, assume that switches $S_{11}$ and $S_{21}$ are initially on and the switches $S_{13}$ and $S_{23}$ are initially off so that current can flow in either direction in the bi-directional switch on the left side of FIG. 2 and assume that we want to turn off the bi-directional switch on the left side of FIG. 2 and turn on the bi-directional switch on the right side of FIG. 2. As shown in FIG. 3A, when the current i >0, the following four steps can be used:

(4) switch $S_{11}$ turns off;
(5) switch $S_{23}$ turns on;
(6) switch $S_{21}$ turns off;
(7) switch $S_{13}$ turns on.

As shown in FIG. 3B, when the current i<0, the following four-step commuting method is possible:

(8) switch $S_{21}$ turns off;
(9) switch $S_{13}$ turn on;
(10) switch $S_{11}$ turns off;
(11) switch $S_{23}$ turns on.

(2) Known 4-Step Voltage-Based Commutation

Known 4-step voltage-based commutation is similar to current-based commutation. Assuming that switches $S_{11}$ and $S_{21}$ are on and switches S13 and S23 are off so that current can flow in either direction in the bi-directional switch on the left side of FIG. 2 and assume that the bi-directional switch on the left side of FIG. 2 is to be turned off, and the bi-directional switch on the right side of FIG. 2 is to be turned on. As shown in FIG. 4A, when voltage $u_a$>voltage $u_b$, the following four steps can be used:

(12) switch $S_{23}$ turns on;
(13) switch $S_{21}$ turns off;
(14) switch $S_{13}$ turns on;
(15) switch $S_{11}$ turns off.

As shown in FIG. 4B, when the voltage $u_a$<voltage $u_b$, the following four steps can be used:

(16) switch $S_{13}$ turns on;
(17) switch $S_{11}$ turns off;
(18) switch $S_{23}$ turns on;
(19) switch $S_{21}$ turns off.

Both current- and voltage-based commutation methods have problems such as taking a very long time to complete commutation, requiring complicated logic circuitry to implement the commutation methods, and requiring accurate current or voltage measurements. The frequency using these known commutation methods is limited because of the long time it takes to complete the commutation.

SUMMARY OF THE INVENTION

To overcome the problems described above, preferred embodiments of the present invention provide fast commutation. Preferred embodiments of the present invention provide 2- or 3-step commutation that achieves one or more of the following advantages:

(20) shorter time to complete commutation.
(21) no need to measure the output current or input voltage because, in a rectifier-based matrix converter, the primary current $i_p$ of the transformer is well defined because the input power factor is unity, i.e. the line-side current and voltage are in the same phase.
(22) easier implementation than known 4-step commutation methods.
(23) suitable for high-frequency applications.

A matrix rectifier that can be used with the preferred embodiments of the present invention includes first, second, and third phases; and uni-directional switches $S_{ij}$, where i=1, 2 and j=1, 2, 3, 4, 5, 6 and where uni-directional switches $S_{1j}$ and $S_{2j}$ are connected together to define first, second, third, fourth, fifth, and sixth bi-directional switches. First ends of the first, third, and fifth bidirectional switches are connected together to provide a positive-voltage node. First ends of the second, fourth, and sixth bidirectional switches are connected together to provide a negative-voltage node. Second ends of the first and fourth bidirectional switches are connected to the first phase. Second ends of the third and sixth bidirectional switches are connected to the second phase. Second ends of the fifth and second bidirectional switches are connected to the third phase. A zero vector is defined by either uni-directional switches $S_{1m}$ and $S_{1n}$ switched on or uni-directional switches $S_{2m}$ and $S_{2n}$ switched on, where (m, n)=(1, 4), (3, 6), (5, 2), and by all other uni-directional switches $S_{pq}$ switched off, where p≠m and q≠n. An active vector is defined by either uni-directional switches $S_{1m}$ and $S_{1n}$ switched on or uni-directional switches $S_{2m}$ and $S_{2n}$ switched on, where m=1, 3, 5; n=2, 4, 6; and m, n are not connected to the same phase, and by all other uni-directional switches $S_{pq}$ switched off, where p≠m and q≠n. Sectors I, II, III, IV, V, and VI are defined by using active vectors with (a, b)=(1, 6), (1, 2), (3, 2), (3, 4), (5, 4), and (5, 6).

According to a preferred embodiment of the present invention, a method of performing commutation in a matrix rectifier from an active vector to a zero vector includes step (a):
for an active vector with uni-directional switches $S_{1m}$ and $S_{1n}$ switched on,
in Sectors I, III, V, turning on uni-directional switch $S_{1x}$, where x is chosen such that (m, x)=(1, 4), (3, 6), (5, 2); and
in Sectors II, IV, VI, turning on uni-directional switch $S_{1x}$, where x is chosen such that (x, n)=(1, 4), (3, 6), (5, 2); or for an active vector with uni-directional switches $S_{2m}$ and $S_{2n}$ switched on,
  in Sectors I, III, V, turning on uni-directional switch $S_{2y}$, where y is chosen such that (y, n)=(1, 4), (3, 6), (5, 2); and
  in Sectors II, IV, VI, turning on uni-directional switch $S_{2y}$, where y is chosen such that (m, y)=(1, 4), (3, 6), (5, 2);
step (b):
  for the active vector with uni-directional switches $S_{1m}$ and $S_{1n}$ initially switched on,
    in Sectors I, III, V, turning off uni-directional switch $S_{1n}$; and
    in Sectors II, IV, VI, turning off uni-directional switch $S_{1m}$; or
  for the active vector with uni-directional switches $S_{2m}$ and $S_{2n}$ initially switched on,
    in Sectors I, III, V, turning off uni-directional switch $S_{2m}$;
    in Sectors II, IV, VI, turning off uni-directional switch $S_{2n}$.

Commutation is preferably performed by measuring input voltage and without measuring output current or output voltage.

According to a preferred embodiment of the present invention, a method of operating a matrix rectifier includes performing commutation from an active vector to a zero vector using the commutation method according to various other preferred embodiments of the present invention and modulating the first, second, third, fourth, fifth, and sixth bi-directional switches based on space vector modulation.

According to a preferred embodiment of the present invention, a method of performing commutation in a matrix rectifier from a zero vector to an active vector includes:
step (a):
  for a zero vector with uni-directional switches $S_{1m}$ and $S_{1n}$ switched on,
    in Sectors I, III, V, turning on uni-directional switch $S_{1x}$, where x=1, 3, 5 and x is chosen such that a negative voltage is provided at the positive-voltage node; and
    in Sectors II, IV, VI, turning on uni-directional switch $S_{1x}$, where x=2, 4, 6 and x is chosen such that a positive voltage is provided at the negative-voltage node; or
  for a zero vector with uni-directional switches $S_{2m}$ and $S_{2n}$ switched on,
    in Sectors I, III, V, turning on uni-directional switch $S_{2y}$, where y=2, 4, 6 and y is chosen such that a positive voltage is provided at the negative-voltage node; and
    in Sectors II, IV, VI, turning on uni-directional switch $S_{2y}$, where y=1, 3, 5 and y is chosen such that a negative voltage is provided at the positive-voltage node;
step (b):
  for the zero vector with uni-directional switches $S_{1m}$ and $S_{1n}$ initially switched on,
    in Sectors I, III, V, turning off uni-directional switch $S_{1m}$; and
    in Sectors II, IV, VI, turning off uni-directional switch $S_{1n}$; or
  for the zero vector with uni-directional switches $S_{2m}$ and $S_{2n}$ initially switched on,
    in Sectors I, III, V, turning off uni-directional switch $S_{2n}$; and
    in Sectors II, IV, VI, turning off uni-directional switch $S_{2m}$; and step (c):
  for the zero vector with uni-directional switches $S_{1m}$ and $S_{1n}$ initially switched on,
    in Sectors I, III, V, turning off uni-directional switches $S_{1x}$ and $S_{1n}$ and turning on uni-directional switches $S_{2x}$ and $S_{2n}$; and
    in Sectors II, IV, VI, turning off uni-directional switches $S_{1x}$ and $S_{1m}$ and turning on uni-directional switches $S_{2x}$ and $S_{2m}$; or
  for the zero vector with uni-directional switches $S_{2m}$ and $S_{2n}$ initially switched on,
    in Sectors I, III, V, turning off uni-directional switches $S_{2m}$ and $S_{2y}$ and turning on uni-directional switches $S_{1m}$ and $S_{1y}$; and
    in Sectors II, IV, VI, turning off uni-directional switches $S_{2n}$ and $S_{2y}$ and turning on uni-directional switches $S_{1n}$ and $S_{1y}$.

Commutation is preferably performed by measuring input voltage and without measuring output current or output voltage. Preferably, in step (a), for the zero vector with uni-directional switches $S_{1m}$ and $S_{1n}$ initially switched on, no current passes through uni-directional switch $S_{1x}$; or for the zero vector with uni-directional switches $S_{2m}$ and $S_{2n}$ initially switched on, no current passes through uni-directional switch $S_{2y}$. Preferably, step (b) lasts until a current through the positive-voltage node or the negative-voltage node reaches zero. The method further preferably includes a transformer connected to the positive-voltage and negative-voltage nodes, where a holding time Δt of step (b) is provided by:

$$\Delta t = \frac{L_o I_{1max}}{U_{1min}}$$

where $I_{1max}$ is a maximum current of the matrix converter, $U_{1min}$ is a minimum output voltage of the matrix converter, and $L_o$ is a leakage inductance of the transformer.

According to a preferred embodiment of the present invention, a method of operating a matrix rectifier includes performing commutation from a zero vector to an active vector using the commutation method according to various other preferred embodiments of the present invention and modulating the first, second, third, fourth, fifth, and sixth bi-directional switches based on space vector modulation.

Preferably, gate signals $s_{ij}$ applied to uni-directional switches $S_{ij}$ are generated by determining a space-vector-modulation sector and generating:
  a carrier signal;
  first, second, and third comparison signals based on dwell times of corresponding zero vector and two active vectors of the space-vector-modulation sector;
  modulation signals $s_i$ corresponding to the first, second, third, fourth, fifth, and sixth bi-directional switches based on the comparison of the carrier signal and the first, second, and third comparison signals, where i=1, 2, 3, 4, 5, 6;
  first converter select signal SelectCon1 and second converter select signal SelectCon2 based on if a positive or a negative voltage is outputted; wherein the gate signals $s_{ij}$ are generated based on:

$$s_{1j} = s_i \times \text{SelectCon1} (j=1,3,5,4,6,2)$$

$$s_{2j} = s_i \times \text{SelectCon2} (j=1,3,5,4,6,2).$$

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention improve the known four-step commutation methods. Current commutation can ensure reliable operation. Because the rectifiers of 3-phase-to-1-phase matrix-converters have a different structure compared to the rectifiers of known 3-phase-to-3-phase matrix converters, rectifiers of a 3-phase-to-1-phase matrix-converter can use a different current-based commutation method, as discussed below.

Figure 1A:
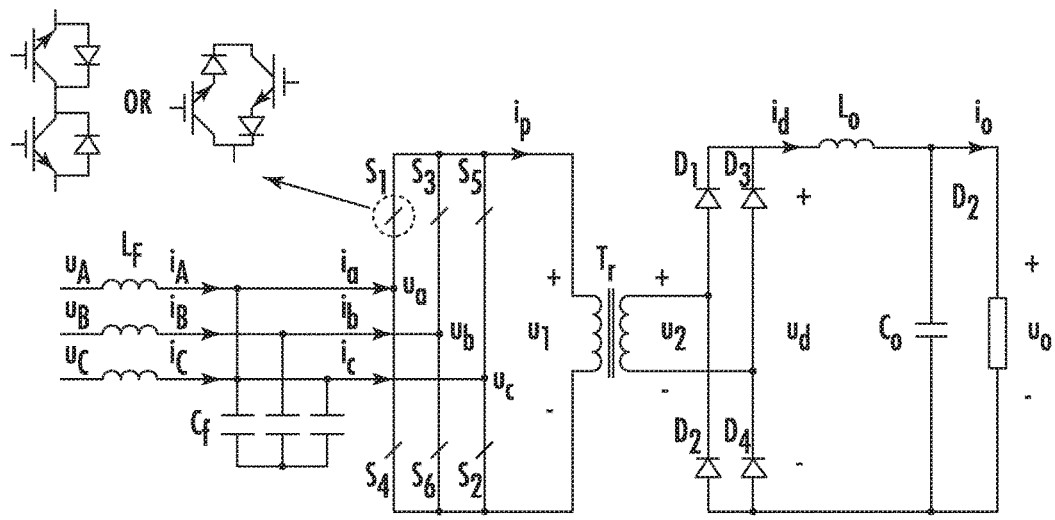
FIGS. 1A and 1B are circuit diagrams of matrix-converters.
Figure 1B:
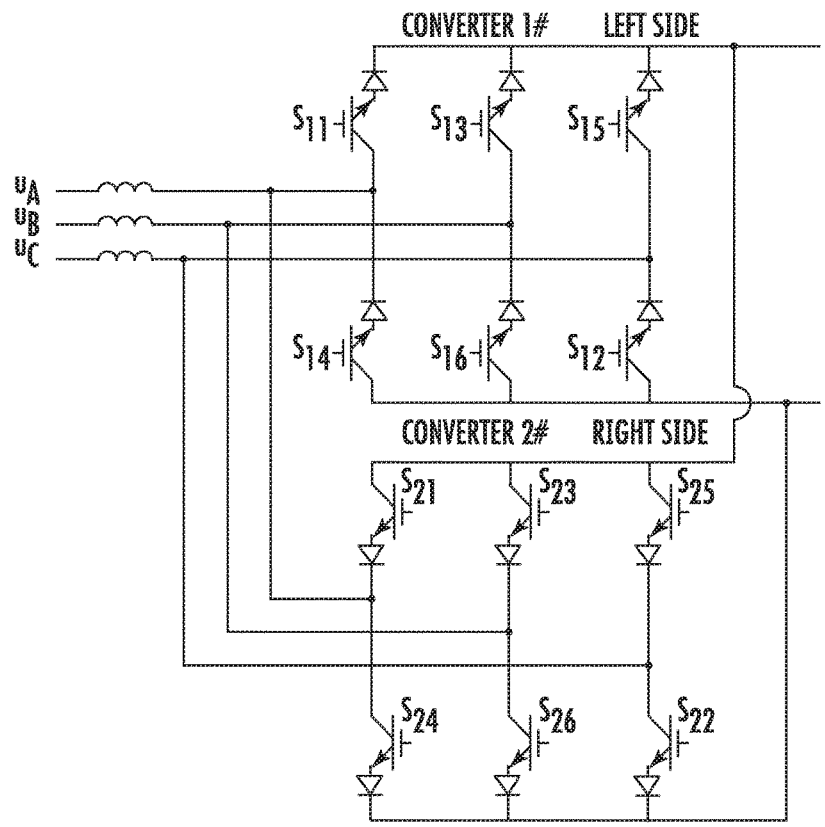
Figure 2:
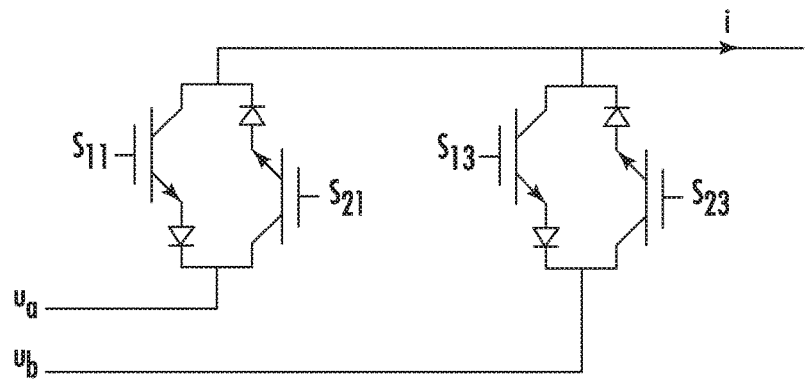
FIG. 2 is a circuit diagram of a two-phase-to-single-phase matrix converter.
Figure 3A:
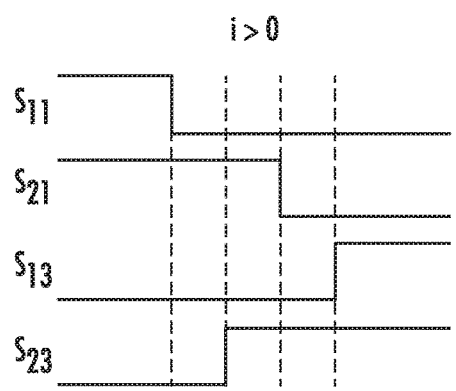
FIGS. 3A and 3B show the steps of current-based commutation.
Figure 3B:
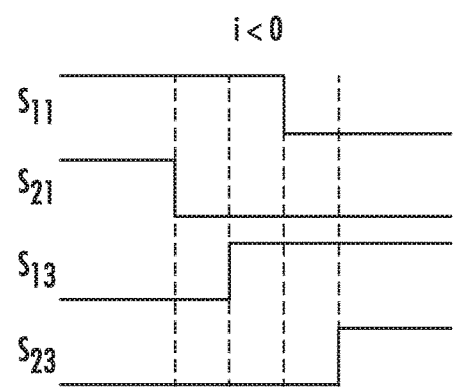
Figure 4A:
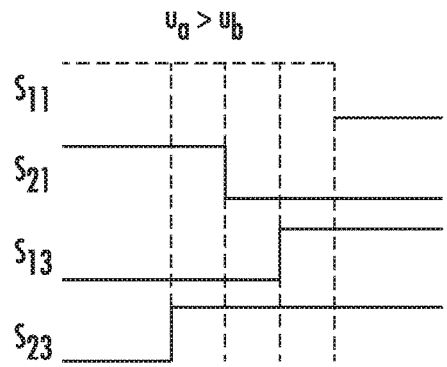
FIGS. 4A and 4B show the steps of voltage-based commutation.
Figure 4B:
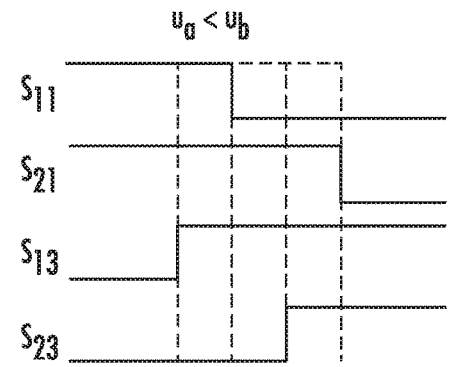
Figure 5:
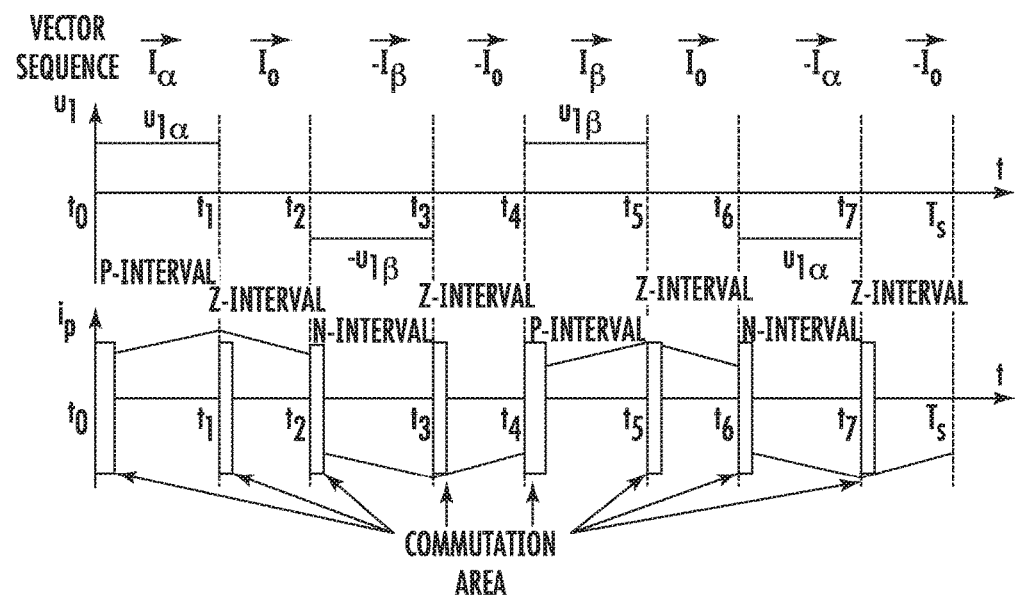
FIG. 5 shows the waveforms of the rectifier of a matrix converter.
Figure 6:
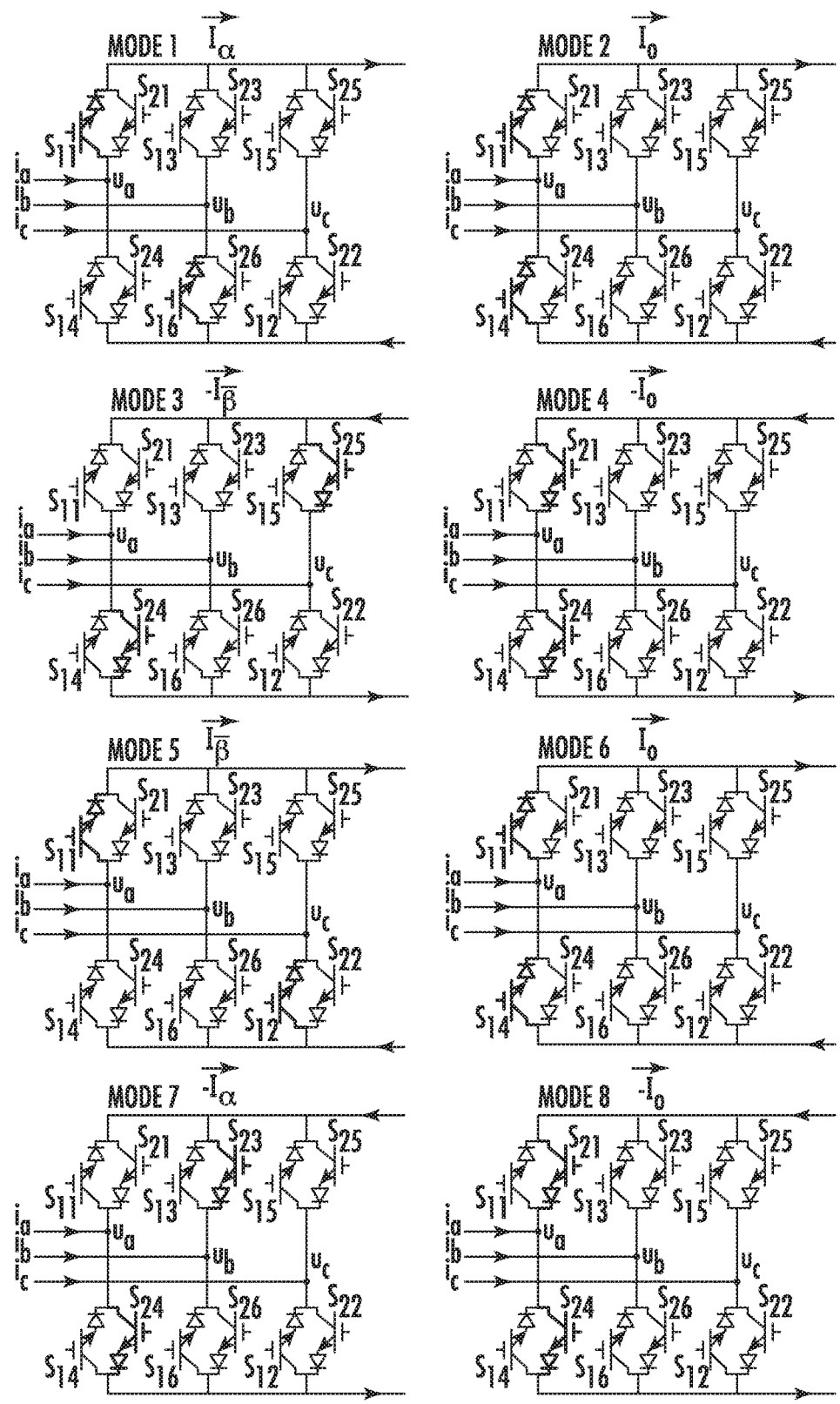
FIG. 6 shows eight switching modes in one sampling period in sector I.

As shown in FIG. 5, the matrix-converter output current $i_p(t)$ is positive in adjacent P- and Z-intervals, except for the commutation area, and the matrix-converter output current $i_p(t)$ is negative in adjacent N- and Z-intervals, except for the commutation area. During adjacent P- and Z-intervals, converter #1 works normally and converter #2 stops working, and in contrast, during adjacent N- and Z-intervals, converter #2 works normally and converter #1 stops working. Thus, there are eight switching modes in one sampling period exclusive of the commutation areas as shown in FIG. 6. In one sampling period, there are two types of current-based commutations: (1) active vector (i.e., either P-vector or N-vector) to zero vector and (2) zero vector to active vector. A two-step active-vector-to-zero-vector commutation and a three-step zero-vector-to-active-vector commutation are discussed below.

(1) Active Vector to Zero Vector (P-Vector to Z-Vector or N-Vector to Z-Vector)

Figure 7A:
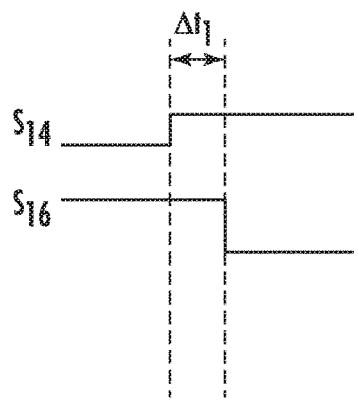
FIGS. 7A and 7B show 2-step commutation from an active vector to a zero vector for a positive current in sector I.
Figure 7B:
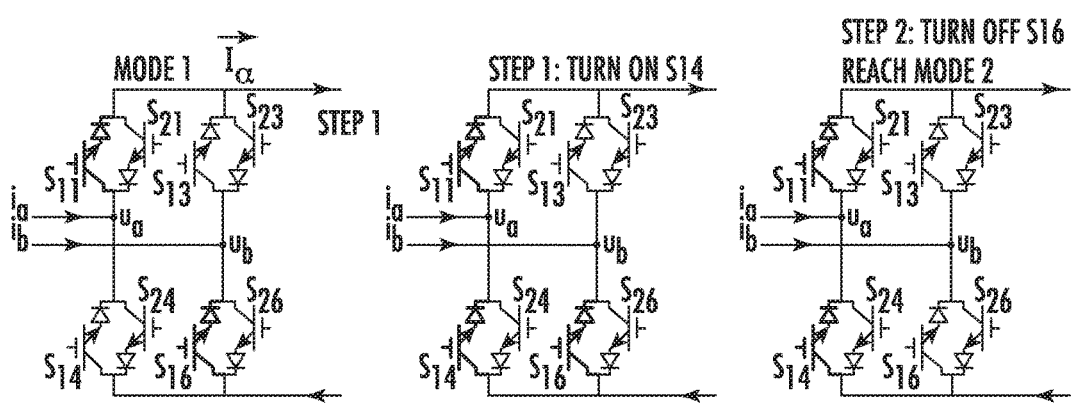

As seen in FIGS. 5 and 6, active-vector-to-zero-vector commutations include the commutations from mode 1 (P-vector) to mode 2 (Z-vector), mode 3 (N-vector) to mode 4 (Z-vector), mode 5 (P-vector) to mode 6 (Z-vector), and mode 7 (N-vector) to mode 8 (Z-vector). During active-vector-to-zero-vector commutation, the direction of the output current of the rectifier of the matrix converter does not change. Thus, active-vector-to-zero-vector commutation only adds an overlap time just as the commutation method of the current-source inverter. The overlap time is added to make sure that the current can smoothly transition from one switch to another switch and that no overvoltage is induced during this transition. The overlap time is determined by the "turn on" and "turn off" speed of these two switches. For example, as shown in FIGS. 7A and 7B, the commutation from mode 1 to mode 2 only has two steps:

(24) switch $S_{14}$ turns on, and
(25) switch $S_{16}$ turns off.

Thus, commutation from an active vector to a zero vector is achieved. FIGS. 7A and 7B show an example of the 2-step commutation from an active vector to a zero vector for a positive current in sector I. Similar commutation steps are performed in sectors III and V.

Figure 15:
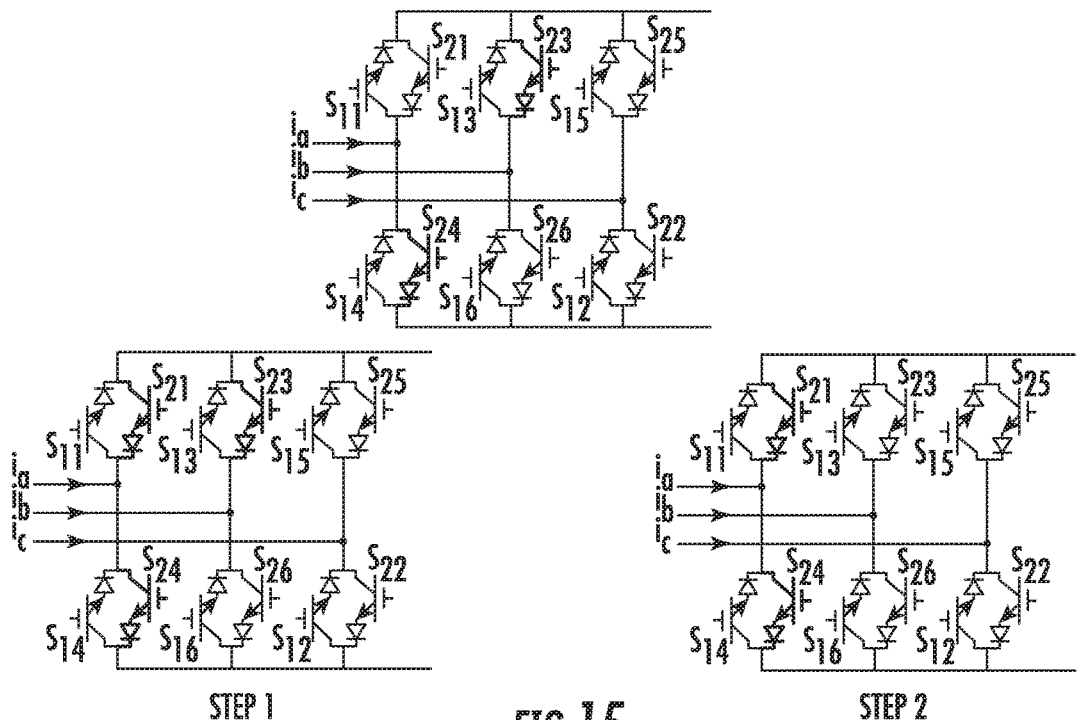
FIG. 15 shows 2-step commutation from an active vector to a zero vector for a negative current in sector I.

FIG. 15 shows a 2-step commutation from an active vector to a zero vector for a negative current in sector I. The commutation steps include:

(26) switch $S_{21}$ turns on, and
(27) switch $S_{23}$ turns off.

Similar commutation steps are performed in sectors III and V.

Figure 17:
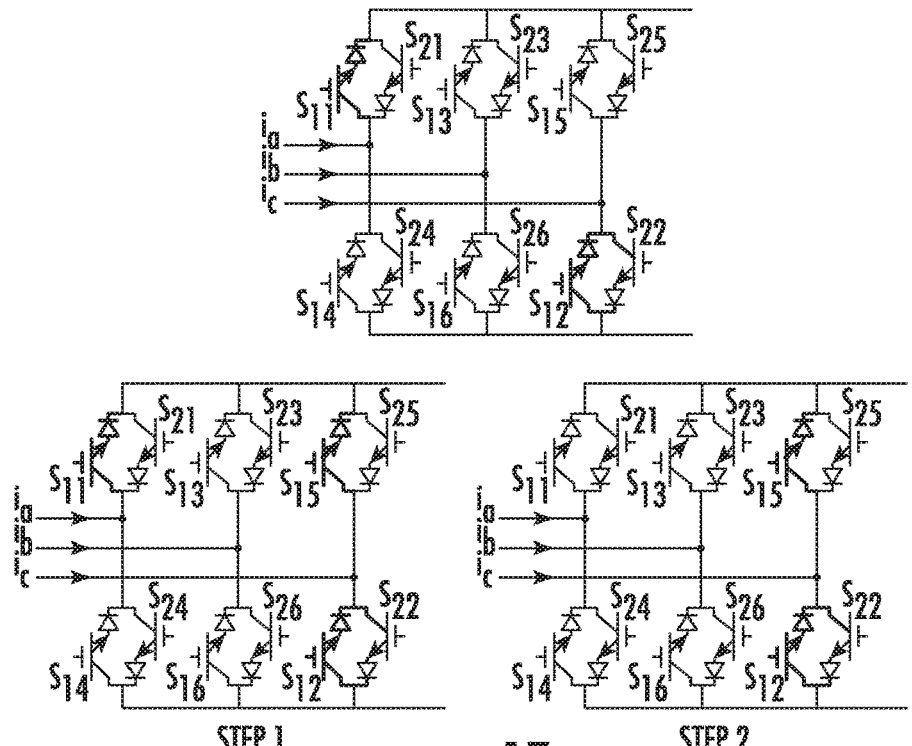
FIG. 17 shows 2-step commutation from an active vector to a zero vector for a positive current in sector II.

FIG. 17 shows a 2-step commutation from an active vector to a zero vector for a positive current in sector II. The commutation steps include:

(28) switch $S_{15}$ turns on, and
(29) switch $S_{11}$ turns off.

Similar commutation steps are performed in sectors IV and VI.

Figure 19:
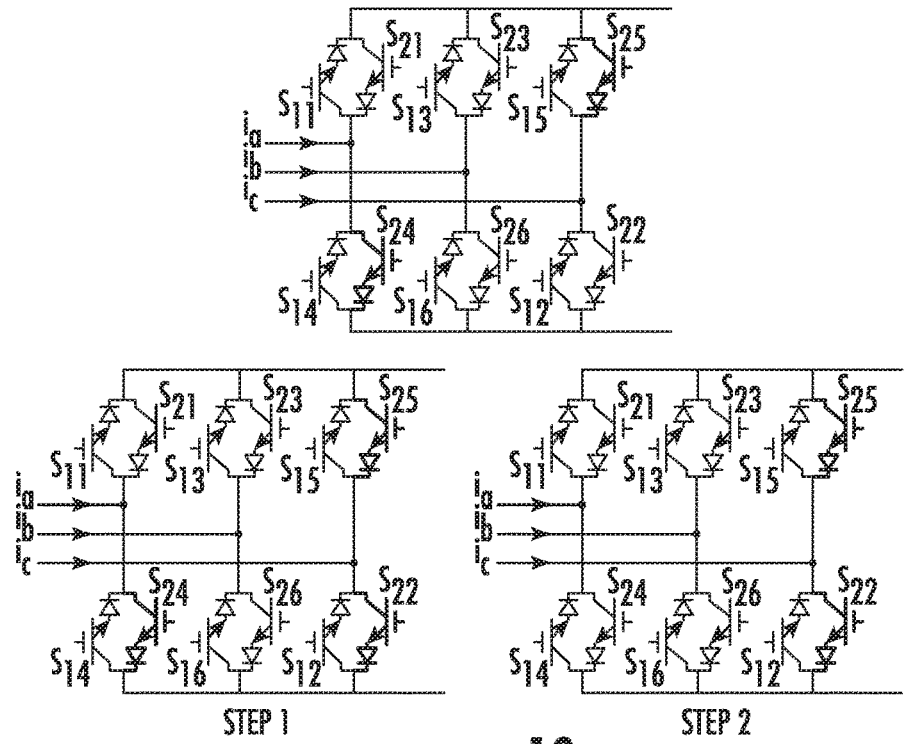
FIG. 19 shows 2-step commutation from an active vector to a zero vector for a negative current in sector II.

FIG. 19 shows a 2-step commutation from an active vector to a zero vector for a negative current in sector II. The commutation steps include:

(30) switch $S_{22}$ turns on, and
(31) switch $S_{24}$ turns off.

Similar commutation steps are performed in sectors IV and VI.

(2) Zero Vector to Active Vector (Z-Vector to P-Vector or Z-Vector to N-Vector)

Figure 8A:
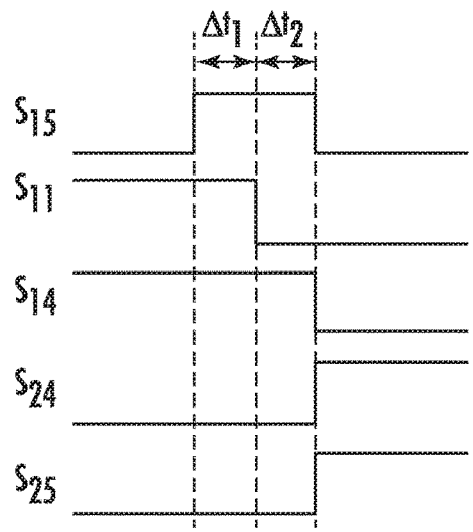
FIGS. 8A and 8B show 3-step commutation from a zero vector to an active vector.
Figure 8B:
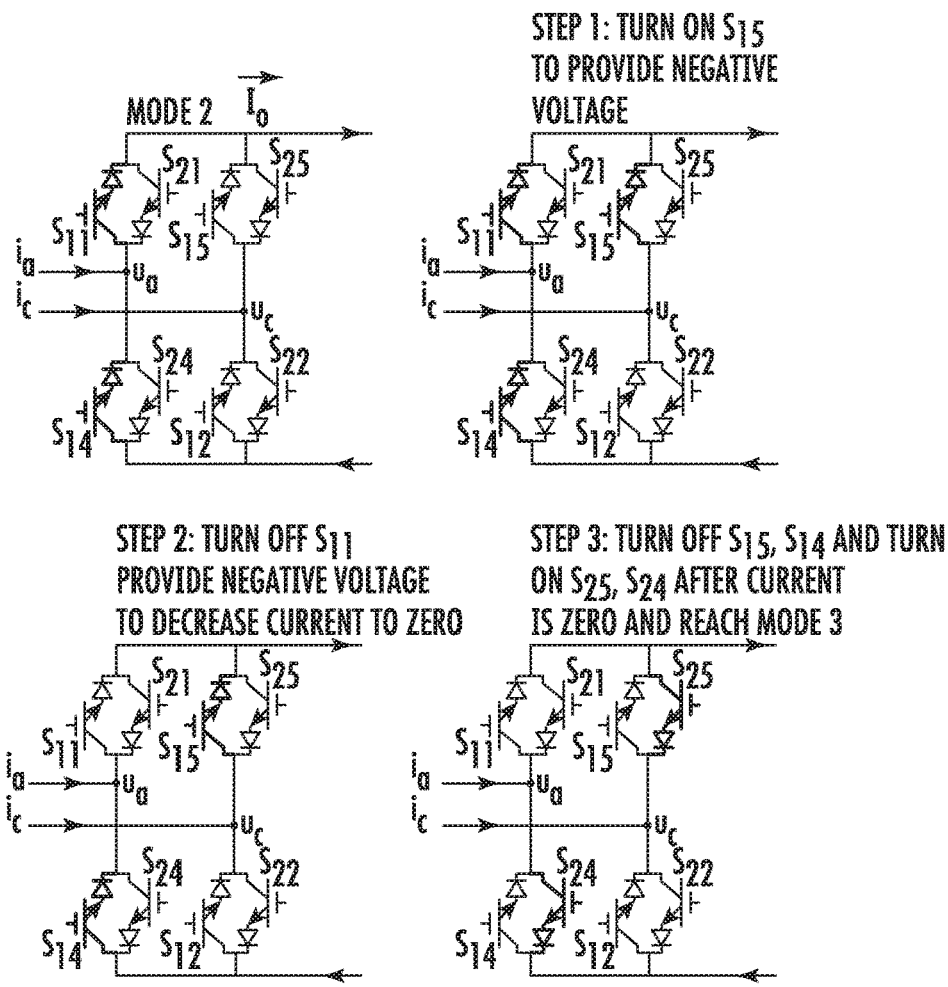

As seen in FIGS. 5 and 6, zero-vector-to-active-vector commutations include the commutations from mode 2 (Z-vector) to mode 3 (N-vector), mode 4 (Z-vector) to mode 5 (P-vector), mode 6 (Z-vector) to mode 7 (N-vector), and mode 8 (Z-vector) to mode 1 of the next sampling period (P-vector). During zero-vector-to-active-vector commutation, the direction of the output current of the rectifier of the matrix converter changes. Thus, zero-vector-to-active-vector commutation requires an additional step. For example, as shown in FIGS. 8A and 8B, the commutation from mode 2 to mode 3 in sector I includes three steps:

(32) switch $S_{15}$ turns on. The purpose of this step is to provide a current path for the next step. Although switch $S_{15}$ is on in this step, there is no current passing through switch $S_{15}$ because the voltage $u_a$ is larger than the voltage $u_c$ and because the diode in series with the switch $S_{15}$ is reversed biased. The output vector is still the Z-vector. The time span $\Delta t_1$ that this step maintains can be decided according to the overlap time of the current-source inverter. The overlap time is added to make sure that the switch $S_{15}$ is on before switch $S_{11}$ turns off, considering the delay between the gate signals of the switches $S_{11}$ and $S_{15}$.

(33) Switch $S_{11}$ turns off. After turning switch $S_{11}$ off, the output vector is substantially the N-vector, so the output current will be reduced sharply and reach zero quickly. This step should last long enough to ensure that the current reaches zero. The holding time $\Delta t_2$ of this step can be estimated by the maximum current $I_{1max}$ of the matrix converter, the minimum output voltage $U_{1min}$ of the matrix converter, and the leakage inductance $L_o$ of the transformer:

$$\Delta t_2 = \frac{L_o I_{1max}}{U_{1min}} \tag{1}$$

For simplicity, the holding time $\Delta t_2$ can be selected as a fixed value according to eq. (1). The holding time $\Delta t_2$ is determined by the transition time required for the output current to reach zero. The holding time $\Delta t_2$ based on eq. (1) is long enough to ensure that the current reaches zero under all the conditions.

(34) Switches $S_{15}$ and $S_{14}$ turn off and switches $S_{24}$ and $S_{24}$ turn on.

Thus, commutation from a zero vector to an active vector is achieved. FIGS. 8A and 8B show an example of the 3-step commutation from a zero vector to an active vector for a positive current in sector I. Similar commutation steps are performed in sectors III and V.

Figure 16:
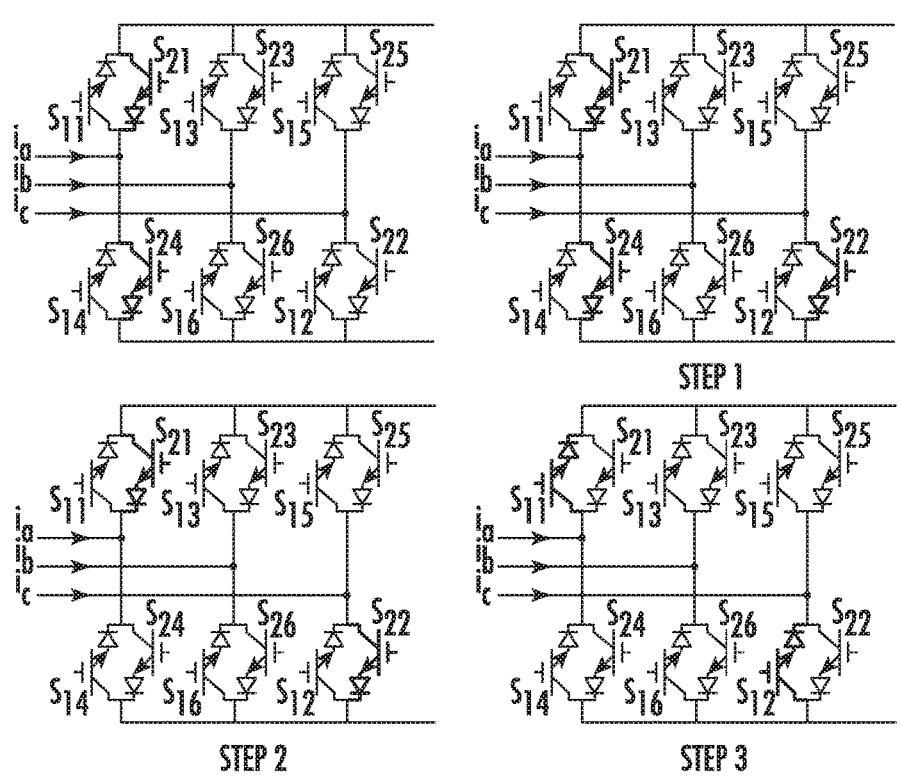
FIG. 16 shows 3-step commutation from a zero vector to an active vector for a negative current in sector I.

FIG. 16 shows a 3-step commutation from a zero vector to an active vector for a negative current in sector I. The commutation steps include:

(35) switch $S_{22}$ turns on,
(36) switch $S_{24}$ turns off, and
(37) switches $S_{21}$ and $S_{22}$ turn off and switches $S_{11}$ and $S_{12}$ turn on.

Similar commutation steps are performed in sectors III and V.

Figure 18:
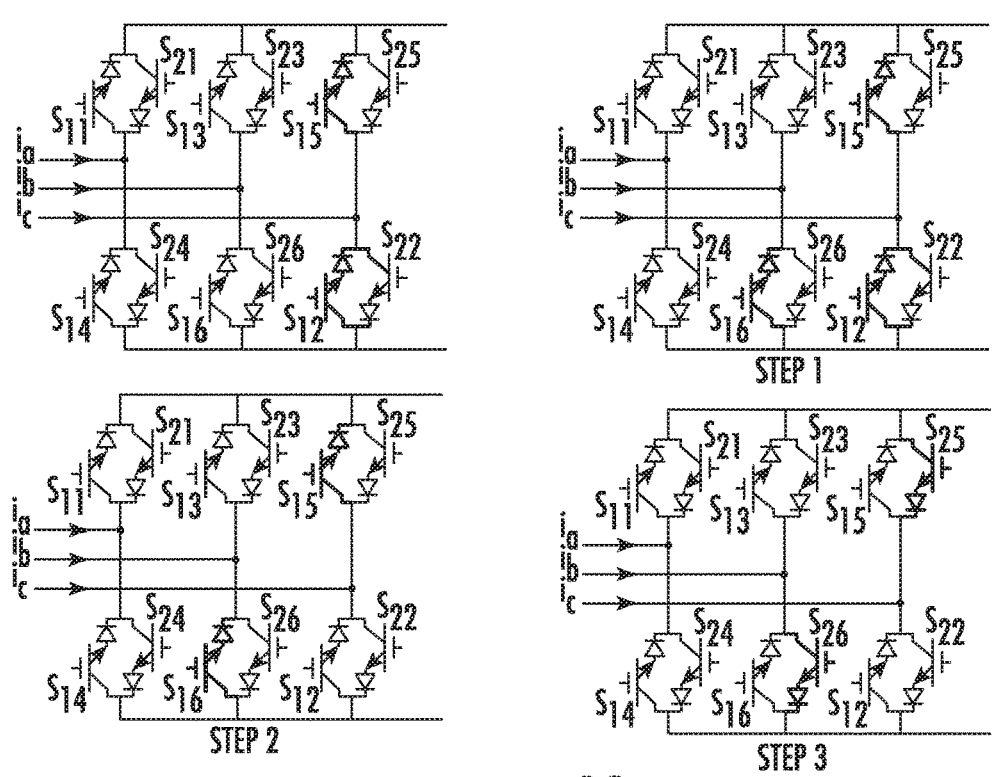
FIG. 18 shows 3-step commutation from a zero vector to an active vector for a positive current in sector II.

FIG. 18 shows a 3-step commutation from a zero vector to an active vector for a positive current in sector II. The commutation steps include:

(38) switch $S_{16}$ turns on,
(39) switch $S_{12}$ turns off, and
(40) switches $S_{15}$ and $S_{16}$ turn off and switches $S_{25}$ and $S_{26}$ turn on.

Similar commutation steps are performed in sectors IV and VI.

Figure 20:
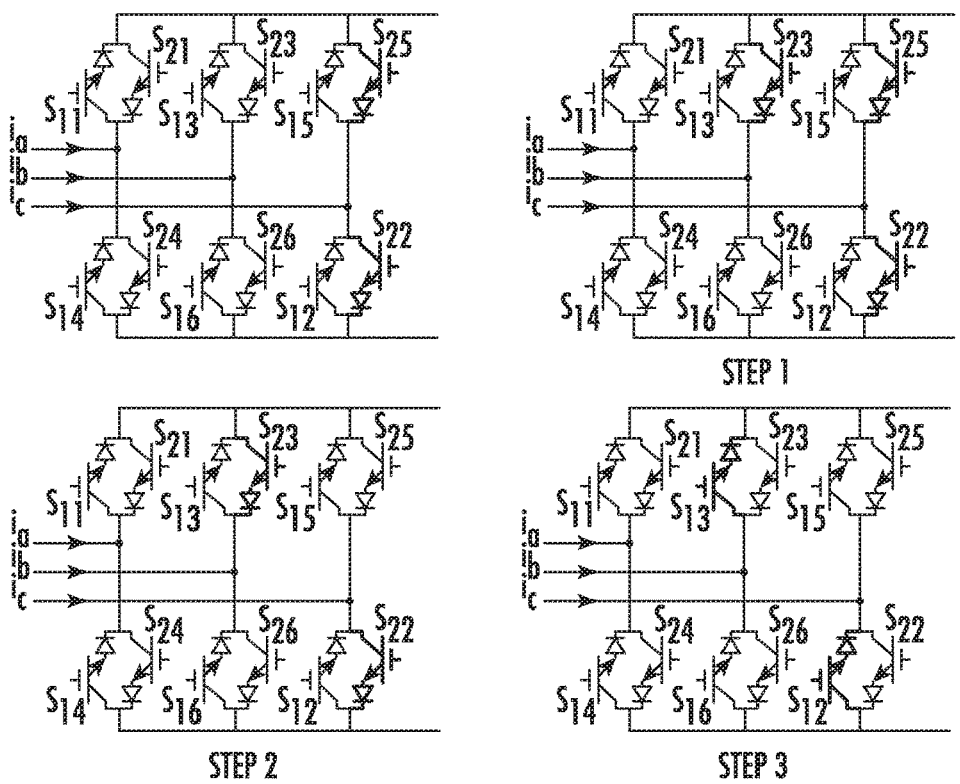
FIG. 20 shows 3-step commutation from a zero vector to an active vector for a negative current in sector II.

FIG. 20 shows a 3-step commutation from a zero vector to an active vector for a negative current in sector II. The commutation steps include:

(41) switch $S_{23}$ turns on,
(42) switch $S_{25}$ turns off, and
(43) switches $S_{23}$ and $S_{22}$ turn off and switches $S_{13}$ and $S_{12}$ turn on.

Similar commutation steps are performed in sectors IV and VI.

Figure 9:
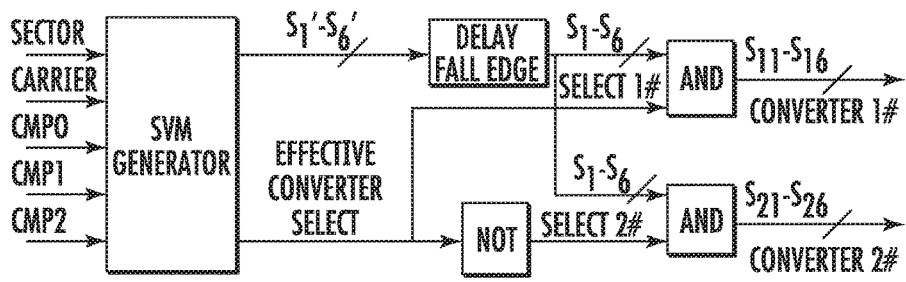
FIG. 9 is a block diagram of gate-signal generator.
Figure 10:
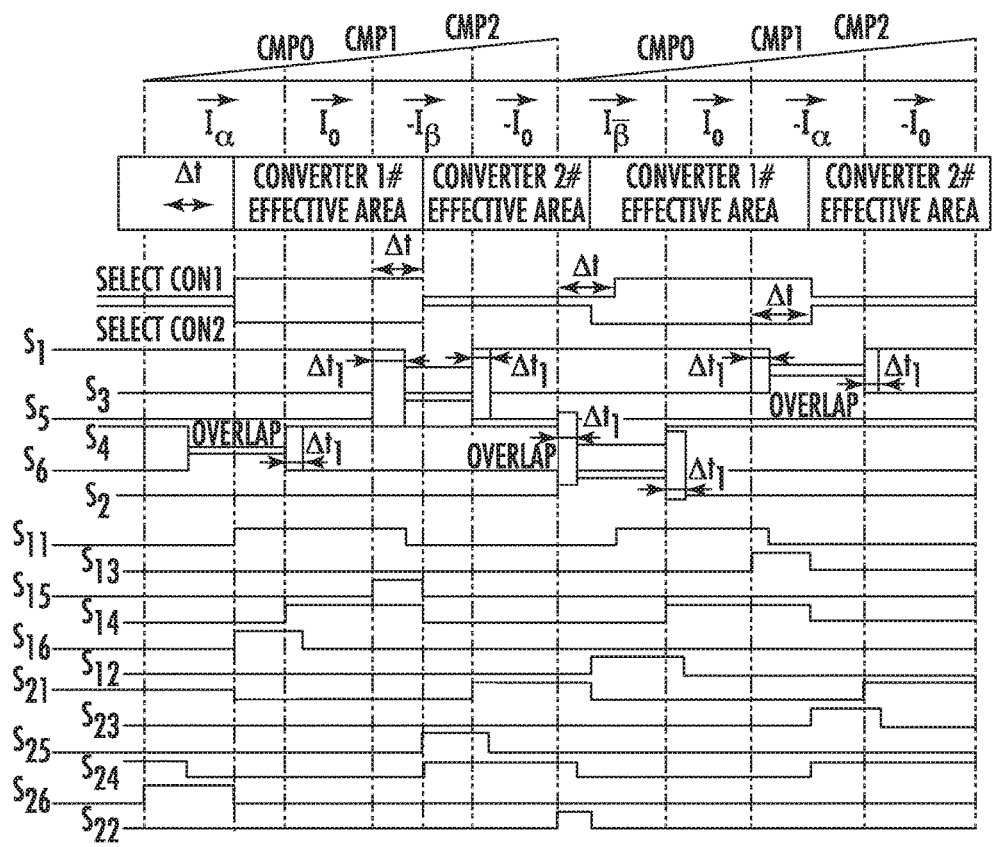
FIG. 10 shows SVM-modulation and commutation signals in one sampling period.

As shown in FIG. 10, the time periods (or "effective area" in FIG. 10) when only converter #1 is on and the time periods when only converter #2 is on are separate from each other. In FIG. 10, the signal SelectCon1 is 1 when converter #1 is on, i.e., the effective area for converter #1, and is 0 when converter #1 is off, i.e., the effective area for converter #2. Similarly, the signal SelectCon2 when converter #2 is on, i.e., the effective area for converter #2, and is 0 when converter #2 is off, i.e., the effective area for converter #1. As shown in FIG. 9, the following three steps can be used to achieve modulation and commutation.

(1) Generate the Signals $S_i$ (i=1, 2, 3, 4, 5, 6)

Accordingly, a carrier signal and three compare value signals CMP0, CMP1, CMP2 are used to generate the SVM PWM signals $S_i'$ (i=1, 2, 3, 4, 5, 6). The compare values signals CMP0, CMP1, CMP2 are determined by the dwell time of each vector. After the holding time $\Delta t_1$ for the falling edge of signals $S_i'$ has lapsed, the signals $S_i$ (i=1, 2, 3, 4, 5, 6) can be generated. The falling edge of signal $S_i$ is delayed for holding time $\Delta t_1$ compared with the signal $S_i'$. An overlap time is added to the signals $S_1$, $S_3$, $S_5$, and $S_4$, $S_6$, $S_2$ just as in the commutation method of the current-source inverter. In sector I, for example, the signals $S_1$, $S_3$, $S_5$ and $S_4$, $S_6$, $S_2$ are shown in FIG. 10.

(2) Generate Signal SelectCon1 and Signal SelectCon2

After comparison between the carrier signal and CMP1 and the delay $\Delta t$ of both rising and falling edges, signal SelectCon1 can be generated, as shown in FIGS. 9 and 10. The fixed delay time $\Delta t$ is based on the three steps of zero-vector-to-active-vector commutation. So the delay time $\Delta t$ can be determined by eq. (2).

$$\Delta t = \Delta t_1 + \Delta t_2 \tag{2}$$

where $\Delta t_1$ is the overlap time and $\Delta t_2$ is estimated by eq. (1).

(3) Generate Gate Signals $S_{i1}$ for Converter #1 and Gate Signals $S_{i2}$ for Converter #2

The gate signals $S_{1j}$ for converter #1 can be generated by eq. (3), and the gate signals $S_{2j}$ for converter #2 can be generated by eq. (4):

$$S_{1j} = S_i \times \text{SelectCon1}(j=1,3,5,4,6,2) \tag{3}$$

$$S_{2j} = S_i \times \text{SelectCon2}(j=1,3,5,4,6,2) \tag{4}$$

For example, in sector I, the gate signals $S_{11}$, $S_{13}$, $S_{15}$, $S_{14}$, $S_{16}$, and $S_{12}$ are generated for converter #1, and the gate signals $S_{21}$, $S_{23}$, $S_{22}$, $S_{24}$, $S_{26}$, and $S_{22}$ are generated for converter #1 as shown in FIG. 10.

Figure 11:
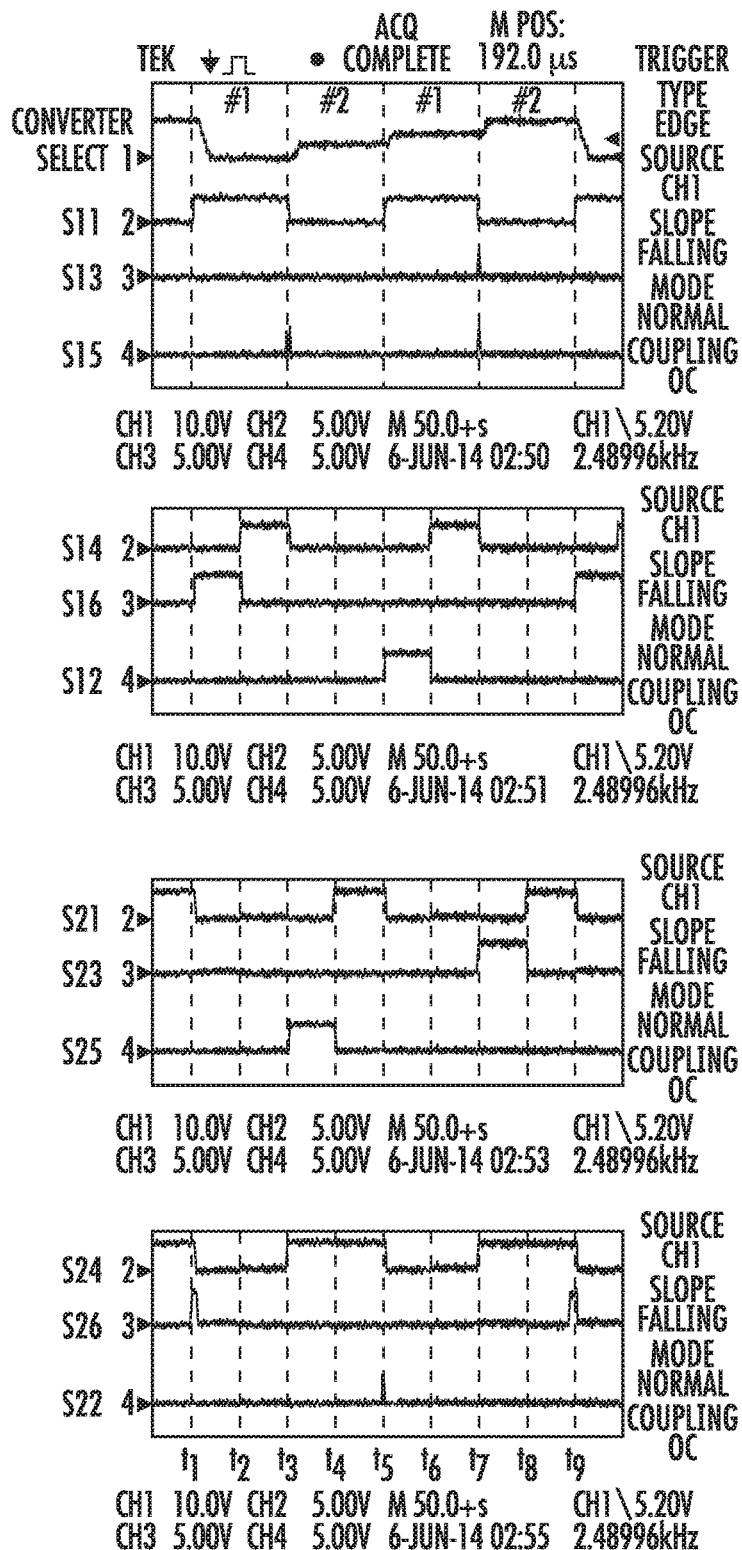
FIG. 11 shows gate signals in one sampling period in sector I.
Figure 12:
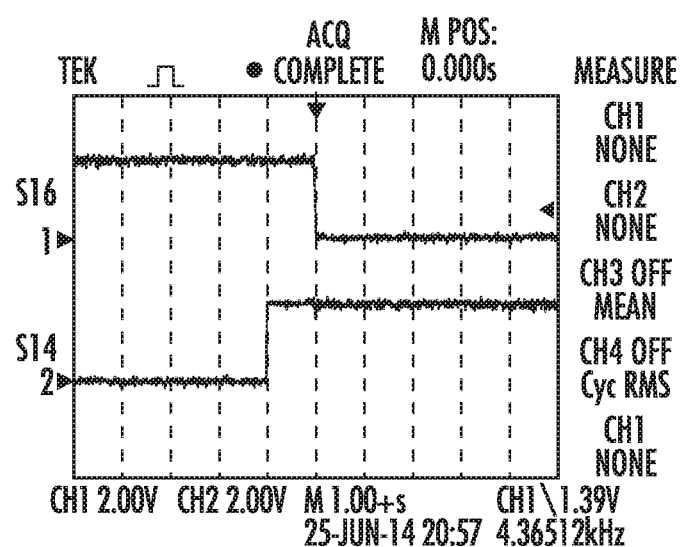
FIG. 12 shows 2-step commutation at time $t_2$.
Figure 13:
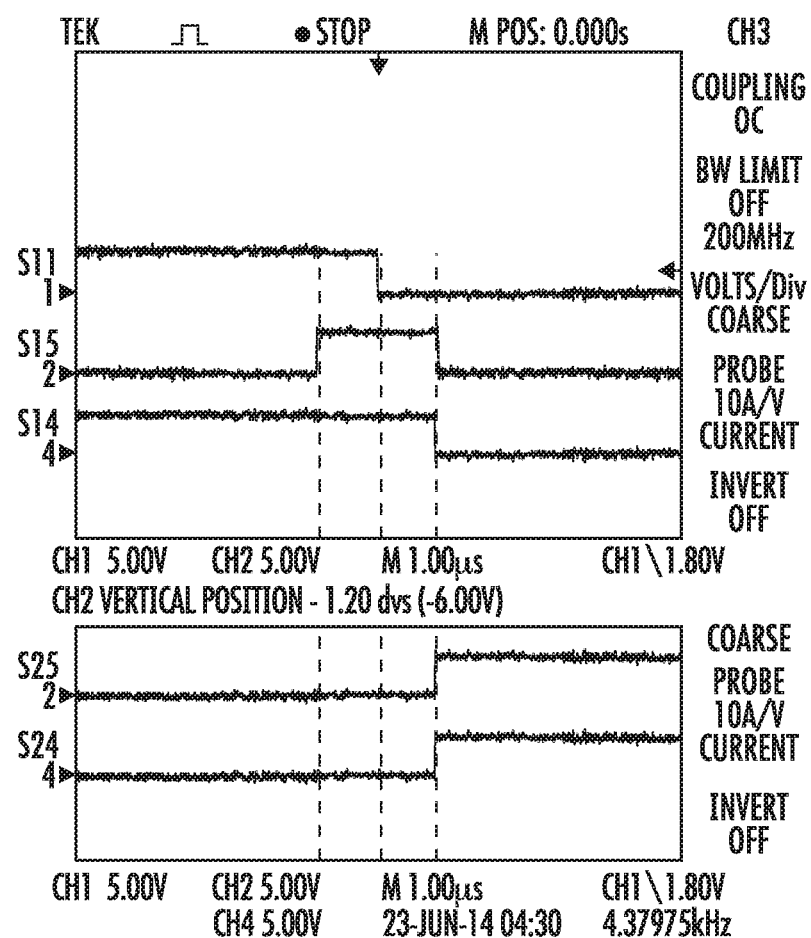
FIG. 13 shows 3-step commutation at time $t_3$.
Figure 14:
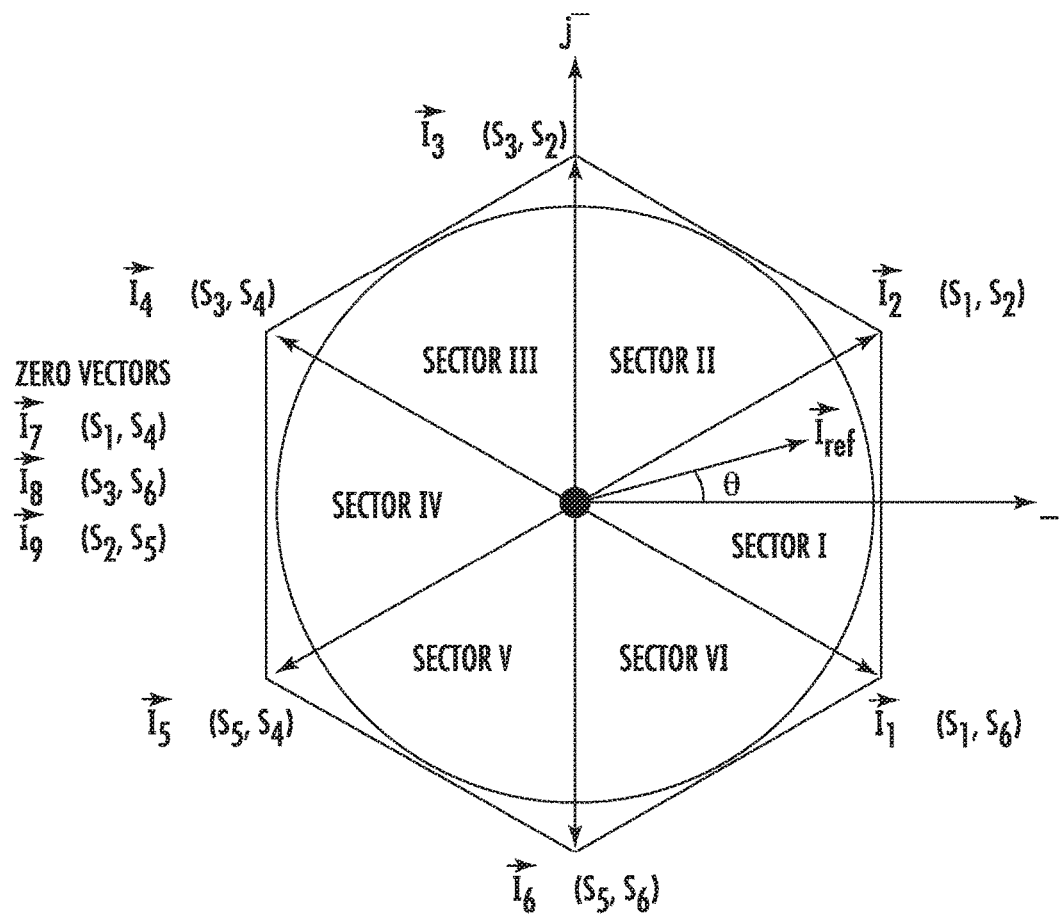
FIG. 14 shows a current-space vector hexagon.

FIGS. 11-13 show the gate signals generated using a field programmable gate array (FPGA) to implement the method described above. FIG. 11 shows the gate signals for switches $S_1$ to $S_6$ in sector I. The time period from time $t_1$ to time $t_9$ is one sampling period $T_s$. Times $t_2$, $t_4$, $t_6$, and $t_8$ use 2-step commutation, and times $t_1$, $t_2$, $t_3$, $t_7$, and $t_9$ use 3-step commutation.

For example, at time $t_2$, the commutation from mode 1 to mode 2 (from active vector to zero vector) as shown in FIG. 7 is in two steps. The 2-step commutation waveforms are shown in FIG. 12. At time $t_3$, the commutation from mode 2 to mode 3 (from zero vector to active vector) as shown in FIG. 8 is in three steps. The 3-step commutation waveforms are shown in FIG. 13.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A matrix rectifier comprising:
   first, second, and third phases; and
   uni-directional switches $S_{ij}$, where i=1, 2 and j=1, 2, 3, 4, 5, 6 and where uni-directional switches $S_{1j}$ and $S_{2j}$ are connected together to define first, second, third, fourth, fifth, and sixth bi-directional switches; wherein
   first ends of the first, third, and fifth bidirectional switches are connected together to provide a positive-voltage node;
   first ends of the second, fourth, and sixth bidirectional switches are connected together to provide a negative-voltage node;
   second ends of the first and fourth bidirectional switches are connected to the first phase;
   second ends of the third and sixth bidirectional switches are connected to the second phase;
   second ends of the fifth and second bidirectional switches are connected to the third phase;
   a zero vector is defined by either uni-directional switches $S_{1m}$ and $S_{1n}$ switched on or unidirectional switches $S_{2m}$ and $S_{2n}$ switched on, where (m, n)=(1, 4), (3, 6), (5, 2), and by all other uni-directional switches $S_{pq}$ switched off, where p≠m and q≠n;
   an active vector is defined by either uni-directional switches $S_{1m}$ and $S_{1n}$ switched on or uni-directional switches $S_{2m}$ and $S_{2n}$ switched on, where m=1, 3, 5; n=2, 4, 6; and m, n are not connected to the same phase, and by all other uni-directional switches $S_{pq}$ switched off, where p≠m and q≠n;
   Sectors I, II, III, IV, V, and VI are defined by using active vectors with (a, b)=(1, 6), (1, 2), (3, 2), (3, 4), (5, 4), and (5, 6);
   commutation from an active vector to a zero vector includes:
   step (a):
      for an active vector with uni-directional switches $S_{1m}$ and $S_{1n}$ switched on,
         in Sectors I, III, V, turning on uni-directional switch $S_{1x}$, where x is chosen such that (m, x)=(1, 4), (3, 6), (5, 2); and
         in Sectors II, IV, VI, turning on uni-directional switch $S_{1x}$, where x is chosen such that (x, n)=(1, 4), (3, 6), (5, 2); or
      for an active vector with uni-directional switches $S_{2m}$ and $S_{2n}$ switched on,
         in Sectors I, III, V, turning on uni-directional switch $S_{2y}$, where y is chosen such that (y, n)=(1, 4), (3, 6), (5, 2); and
         in Sectors II, IV, VI, turning on uni-directional switch $S_{2y}$, where y is chosen such that (m, y)=(1, 4), (3, 6), (5, 2); and
   step (b):
      for the active vector with uni-directional switches $S_{1m}$ and $S_{1n}$ initially switched on,
         in Sectors I, III, V, turning off uni-directional switch $S_{1n}$; and
         in Sectors II, IV, VI, turning off uni-directional switch $S_{1m}$; or
      for the active vector with uni-directional switches $S_{2m}$ and $S_{2n}$ initially switched on,
         in Sectors I, III, V, turning off uni-directional switch $S_{2m}$;
         in Sectors II, IV, VI, turning off uni-directional switch $S_{2n}$;
   the commutation includes not measuring output current or input voltage.

2. A matrix rectifier comprising:
   first, second, and third phases; and
   uni-directional switches $S_{ij}$, where i=1, 2 and j=1, 2, 3, 4, 5, 6 and where uni-directional switches $S_{1j}$ and $S_{2j}$ are connected together to define first, second, third, fourth, fifth, and sixth bi-directional switches; wherein
   first ends of the first, third, and fifth bidirectional switches are connected together to provide a positive-voltage node;
   first ends of the second, fourth, and sixth bidirectional switches are connected together to provide a negative-voltage node;
   second ends of the first and fourth bidirectional switches are connected to the first phase;
   second ends of the third and sixth bidirectional switches are connected to the second phase;
   second ends of the fifth and second bidirectional switches are connected to the third phase;
   a zero vector is defined by either uni-directional switches $S_{1m}$ and $S_{1n}$ switched on or unidirectional switches $S_{2m}$ and $S_{2n}$ switched on, where (m, n)=(1, 4), (3, 6), (5, 2), and by all other uni-directional switches $S_{pq}$ switched off, where p≠m and q≠n;
   an active vector is defined by either uni-directional switches $S_{1m}$ and $S_{1n}$ switched on or uni-directional switches $S_{2m}$ and $S_{2n}$ switched on, where m=1, 3, 5; n=2, 4, 6; and m, n are not connected to the same phase, and by all other uni-directional switches $S_{pq}$ switched off, where p≠m and q≠n; and
   Sectors I, II, III, IV, V, and VI are defined by using active vectors with (a, b)=(1, 6), (1, 2), (3, 2), (3, 4), (5, 4), and (5, 6);
   commutation from a zero vector to an active vector includes:
   step (a):
      for a zero vector with uni-directional switches $S_{1m}$ and $S_{1n}$ switched on,
         in Sectors I, III, V, turning on uni-directional switch $S_{1x}$, where x=1, 3, 5 and x is chosen such that a negative voltage is provided at the positive-voltage node; and
         in Sectors II, IV, VI, turning on uni-directional switch $S_{1x}$, where x=2, 4, 6 and x is chosen such that a positive voltage is provided at the negative-voltage node; or
      for a zero vector with uni-directional switches $S_{2m}$ and $S_{2n}$ switched on,
         in Sectors I, III, V, turning on uni-directional switch $S_{2y}$, where y=2, 4, 6 and y is chosen such that a positive voltage is provided at the negative-voltage node; and
         in Sectors II, IV, VI, turning on uni-directional switch $S_{2y}$, where y=1, 3, 5 and y is chosen such that a negative voltage is provided at the positive-voltage node;

step (b):
- for the zero vector with uni-directional switches $S_{1m}$ and $S_{1n}$ initially switched on,
  - in Sectors I, III, V, turning off uni-directional switch $S_{1m}$; and
  - in Sectors II, IV, VI, turning off uni-directional switch $S_{1n}$; or
- for the zero vector with uni-directional switches $S_{2m}$ and $S_{2n}$ initially switched on,
  - in Sectors I, III, V, turning off uni-directional switch $S_{2n}$; and
  - in Sectors II, IV, VI, turning off uni-directional switch $S_{2m}$; and step (c):
- for the zero vector with uni-directional switches $S_{1m}$ and $S_{1n}$ initially switched on,
  - in Sectors I, III, V, turning off uni-directional switches $S_{1x}$ and $S_{1n}$ and turning on uni-directional switches $S_{2x}$ and $S_{2n}$; and
  - in Sectors II, IV, VI, turning off uni-directional switches $S_{1x}$ and $S_{1m}$ and turning on uni-directional switches $S_{2x}$ and $S_{2m}$; or
- for the zero vector with uni-directional switches $S_{2m}$ and $S_{2n}$ initially switched on,
  - in Sectors I, III, V, turning off uni-directional switches $S_{2m}$ and $S_{2y}$ and turning on uni-directional switches $S_{1m}$ and $S_{1y}$; and
  - in Sectors II, IV, VI, turning off uni-directional switches $S_{2n}$ and $S_{2y}$ and turning on uni-directional switches $S_{1n}$ and $S_{1y}$;

the commutation includes not measuring output current or input voltage.

* * * * *